United States Patent [19]

Rapp et al.

[11] 4,438,084
[45] Mar. 20, 1984

[54] MANUFACTURE OF HYDROXYLAMMONIUM SALTS

[75] Inventors: Guenther Rapp, Ludwigshafen; Erwin Thomas, Freinsheim; Rolf Muenster, Speyer, all of Fed. Rep. of Germany

[73] Assignee: BASF Aktiengesellschaft, Fed. Rep. of Germany

[21] Appl. No.: 450,581

[22] Filed: Dec. 17, 1982

Related U.S. Application Data

[63] Continuation of Ser. No. 119,927, Feb. 8, 1980, abandoned, which is a continuation-in-part of Ser. No. 942,890, Sep. 18, 1978, abandoned.

[30] Foreign Application Priority Data

Sep. 27, 1977 [DE] Fed. Rep. of Germany ....... 2743346

[51] Int. Cl.$^3$ ............................................. C01B 21/20
[52] U.S. Cl. ................................... 423/387; 75/128 N
[58] Field of Search ............... 423/387, 388; 75/128 N

[56] References Cited

U.S. PATENT DOCUMENTS 4,172,716 10/1979 Abo et al. ..................... 75/128 N

FOREIGN PATENT DOCUMENTS 712467 7/1954 United Kingdom ............... 423/387

*Primary Examiner*—Edward J. Meros
*Assistant Examiner*—Wayne A. Langel
*Attorney, Agent, or Firm*—Keil & Witherspoon

[57] ABSTRACT

Hydroxylammonium salts are manufactured by a process comprising the catalytic reduction of nitric oxide with hydrogen in a dilute aqueous mineral acid in the presence of a suspended platinum catalyst at an elevated temperature, wherein the reaction is carried out in vessels of which the walls consist essentially of conventional copper-free molybdenum-containing austenitic chromium-nickel steels which contain from 16 to 28% by weight of chromium, from 10 to 50% by weight of nickel, from 1 to 4% by weight of molybdenum and at most 0.05% by weight of carbon, together with at least 0.05% by weight of nitrogen up to 0.5% by weight.

6 Claims, No Drawings

MANUFACTURE OF HYDROXYLAMMONIUM SALTS

This is a continuation, of application Ser. No. 119,927 which, is a continuation-in-part of Ser. No. 942,890 filed Feb. 8, 1980, and Sept. 18, 1978, respectively, both abandoned.

BACKGROUND OF THE INVENTION

The present invention relates to a process for the manufacture of hydroxylammonium salts by catalytically reducing nitric oxide with hydrogen in a dilute aqueous mineral acid in the presence of a suspended platinum catalyst at an elevated temperature, wherein the reaction is carried out in a vessel consisting of certain specific materials.

In the manufacture of hydroxylammonium salts by catalytically reducing nitric oxide with hydrogen in a dilute aqueous mineral acid in the presence of a suspended platinum catalyst at an elevated temperature, a problem which arises is that the acid reducing reaction mixture is extremely corrosive. Only a limited selection of materials sufficiently resistant to corrosion is available. Plastics, e.g. polyvinyl chloride, polyethylene, polypropylene and polytetrafluorethylene, synthetic rubbers and natural rubbers have proved suitable. Equipment lined with enamel, graphite, platinum or tantalum has also proved suitable for such corrosive media.

The disadvantage of using such materials for constructing the reactor are on the one hand the high cost and difficulty of processing the materials, and on the other hand unsatisfactory properties such as fragility, embrittlement on aging, sensitivity to impact and shock, and low mechanical strength. These properties make it particularly difficult to construct reactors for the manufacture of a hydroxylammonium salt if the synthesis is to be carried out under pressure.

A number of commercial steel alloys of high mechanical strength and good corrosion resistance have also proved unsatisfactory for use in conjunction with the synthesis of hydroxylamine by catalytically reducing nitric oxide in an aqueous mineral acid. Chromium-nickel steels containing added titanium (material 1.4541) undergo corrosion under the influence of the reducing, strongly acid aqueous reaction medium. Other corrosion-resistant chromium-nickel steels, containing added molybdenum as well as copper, which are particularly stable to dilute sulfuric acid under normal use conditions, also exhibit corrosion. However, a particular disadvantage is the adverse effect, on the course of the reaction, of the constituents of the metal alloys which pass into solution.

SUMMARY AND DETAILED DESCRIPTION OF THE INVENTION

It is an object of the present invention to carry out the reaction entailed in the manufacture of hydroxylammonium salts by reducing nitric oxide with hydrogen in an acid medium in reaction vessels which are virtually non-corroding, insensitive to impact and shock, resistant to aging and easily processable, and which possess high mechanical strength so that the reaction can also be carried out under superatmospheric pressure.

We have found that this object is achieved by providing a process for the manufacture of hydroxylammonium salts which comprises the catalytic reduction of nitric oxide with hydrogen in a dilute aqueous mineral acid in the presence of a suspended platinum catalyst at an elevated temperature, wherein the reaction is carried out in vessels of which the walls consist essentially of conventional copper-free molybdenum-containing austenitic chromium-nickel steels which contain from 16 to 28% by weight of chromium, from 10 to 50% by weight of nickel, from 1 to 4% by weight of molybdenum and at most 0.05% by weight of carbon, together with a minor amount of nitrogen, the amount being at least 0.05% and not greater than 0.5% by weight.

The process of the invention has the advantage that the materials used possess excellent resistance to corrosion by the reaction medium and do not release any materials detrimental to the course of the reaction into the said medium. Furthermore, the materials used are insensitive to aging, impact and shock and have excellent mechanical strength, good processability and a long life.

As a rule, the reaction is carried out with a hydrogen/nitric oxide mixture in which the molar ratio of hydrogen to nitric oxide is >1. Preferably, a molar ratio of from 1.5:1 to 6:1 is maintained. Particularly good results are obtained by maintaining a molar ratio of hydrogen to nitric oxide of 3.5:1 to 5:1 in the reaction zone.

In general, the mineral acid used in a non-reducing strong mineral acid, e.g. perchloric acid, nitric acid, sulfuric acid or phosphoric acid. Acid salts of these, e.g. ammonium bisulfate, may also be used. The use of sulfuric acid is particularly preferred. As a rule, the aqueous acid is initially from 4 N to 6 N and is not allowed to fall below 0.2 N in the course of the reaction.

The reaction is advantageously carried out at from 30° to 80° C., more particularly at from 40° to 60° C. As a rule, the reaction is carried out under atmospheric pressure or superatmospheric pressure, e.g. at up to 300 bar.

The platinum catalyst used is in general a supported catalyst. Platinum on a carbon carrier, especially on graphite, has proved particularly suitable. The catalyst is employed in a finely divided form, as a suspension. Preferably, the catalyst contains from 0.2 to 5% by weight of platinum. Advantageously, it additionally contains one or more elements of main groups 5 and/or 6 of the periodic table, having an atomic weight of >31, as well as lead and/or mercury as a catalyst poison. Suitable calalysts and their manufacture are described, for example, in German Published Application DAS No. 1,088,037 and in German Pat. Nos. 920,963, 956,038 and 945,752.

The reaction is carried out in vessels of which the walls consist essentially of conventional essentially copper-free molybdenum-containing austenitic chromium-nickel steels which contain from 16 to 28% by weight of chromium, from 10 to 50% by weight of nickel, from 1 to 4% by weight of molybdenum and at most 0.05% by weight of carbon, together with at least 0.05% up to 0.5% by weight of nitrogen. Of course, the remainder is iron. Essentially copper-free means that copper has not been added, as an alloying metal, in producing the alloy. This, however, does not exclude the presence of adventitious amounts of copper being present in the steel; if the steel is manufactured from scrap iron, such copper is inevitably introduced in small amounts. In addition, the presence in the materials of other elements usually encountered in steels, e.g. manganese or silicon, is also not excluded.

The term reaction vessel is to be interpreted in its broadest sense. It not only encompasses the walls of the actual vessel but also the accessory pipelines, pumps, condensers and stirrers, i.e. all walls which come into contact with the reaction mixture should consist of the material according to the invention. The steel alloys according to the invention possess all the advantages of austenitic alloy steels for equipment construction, e.g. they can be cast and shaped, are easily processable and can be welded, in each case using conventional techniques. Their high mechanical strength permits their use as a material for high-pressure reactors. Their decisive advantage, in addition to their attractive price, is their high resistance to corrosion by the reducing strongly acid aqueous reaction medium. It is surprising that the synthesis of hydroxylamine proves trouble-free after the walls of the vessel have been exposed to attack by the reaction medium, under the reaction conditions, for about 200 hours. The passivation thus achieved was not achievable hitherto by other, conventional passivating agents.

The hydroxylammonium salts manufactured by the process of the invention may be used for the manufacture of cyclohexanone-oxime, a caprolactam intermediate.

The Examples which follow illustrate the invention.

EXAMPLES 1 AND 2 AND COMPARATIVE EXAMPLES 1a AND 2a

Four reaction vessels connected in series are each filled with 6,000 liters of 4.5 N sulfuric acid and 150 kg of a platinum-graphite catalyst containing 1% by weight of platinum. With the connecting lines closed, the contents of the reaction vessels are exposed to a hydrogen/nitric oxide mixture, in the molar ratio of 1.7:1, so as to result in the following concentration of free sulfuric acid in the individual reaction vessels.

Reactor 1: 3.2 N
Reactor 2: 2.0 N
Reactor 3: 0.95 N
Reactor 4: 0.3 N

The connecting lines between the individual reaction vessels are now opened and 20% strength by weight sulfuric acid together with platinum catalyst is introduced into reactor 1 and passed through the reactors to a separating unit. The catalyst separated from the hydroxylammonium sulfate solution formed is returned to reaction vessel 1. At the same time, a mixture of hydrogen and nitric oxide of the above composition is passed in parallel through reactors 4, 3 and 2. The off-gases from these reactors are collected and are conjointly passed through reactor 1. This gives 380 kg/h of hydroxylamine in the form of a hydroxylammonium sulfate solution, the yield of hydroxylamine being 93.5% based on nitric oxide converted.

Samples of various types of stainless steel are introduced into the first reaction vessel and exposed to the reaction medium for 8 months. After withdrawing the samples, their annual surface wear is calculated from the length of exposure and the weight loss, taking into account the exposed surface and the density. The results are shown in the Table which follows.

TABLE

| Material | Material No. | C | Cr | Ni | Mo | Cu | Ti | Nb | N | Yearly wear (mm) |
| --- | --- | --- | --- | --- | --- | --- | --- | --- | --- | --- |
| Comparative Example 1a | 1.4541 | 0.07 | 18 | 10.5 | — | — | 0.45 | — | — | almost dissolved |
| Example 1 | 1.4406 | 0.025 | 17.5 | 12.5 | 2.3 | — | — | — | 0.15 | 0.08 |
| Comparative Example 2a | 1.4505 | 0.05 | 18 | 20 | 2.25 | 2.0 | — | 0.63 | — | 0.47 |
| Example 2 | 1.4465 | 0.022 | 25 | 25 | 2.25 | — | — | — | 0.12 | 0.01 |

EXAMPLE 3

The procedure described in Example 1 is followed but in the equipment of the first reaction, 3% of the exposed material surface is replaced by material No. 1.4465 containing 25% of Ni, 25% of Cr, 2.25% of Mo, 0.02% of C and 0.12% of N. After 6 months' sustained operation at a sulfuric acid concentration of from 3.0 to 3.2 N, no wear of the sheets of material No. 1.4465 is detectable and the hydroxylamine synthesis takes placed unimpaired.

COMPARATIVE EXAMPLE 3

The procedure described in Example 1 is followed but in the equipment of the second reactor 2.5% of the exposed material surface is replaced by material No. 1.4571 containing 12% of Ni, 17.5% of Cr, 2.25% of Mo, 0.06% of C and 0.47% of Ti. At a sulfuric acid concentration of from 1.9 to 2.1 N, little wear of material No. 1.4571 is externally detectable after 14 months' sustained operation, but the yield of hydroxylamine in the synthesis falls by 4.5% and the yield of the undesirable by-product ammonium sulfate rises by 70%.

We claim:

1. A process for the manufacture of hydroxylammonium salts conducted in a passivated reaction vessel which is non-corroding, insensitive to impact and shock, resistant to aging and easily processable, which possesses high mechanical strength and which does not release materials detrimental to the course of reaction into solution; said process comprising the catalytic reduction of nitric oxide with hydrogen in a dilute aqueous mineral acid in the presence of a suspended platinum catalyst at an elevated temperature in a passivated reaction vessel, wherein the walls of the reaction vessel consist of essentially copper-free molybdenum-containing austenitic chromium-nickel steel, which consists of from 16 to 28% by weight of chromium, from 10 to 50% by weight of nickel, from 1 to 4% by weight of molybdenum, at most 0.05% by weight of carbon, and 0.12% to 0.5% by weight of nitrogen, remainder iron said reaction vessel having been passivated by exposure to the process for the manufacture of hydroxylammonium salts for about 200 hours, whereby no materials detrimental to the course of reaction are released on exposure to the process.

2. The process of claim 1, wherein the passivated reaction vessel walls consist of an austenitic steel which consists essentially of about 17.5% by weight of chromium, about 12.5% by weight of nickel, about 2.3% by weight of molybdenum, about 0.025% by weight of carbon and about 0.15% by weight of nitrogen.

3. The process of claim 1, wherein the passivated reaction vessel walls consist of an austenitic steel which consists essentially of about 25% by weight of chromium, about 25% by weight of nickel, about 2.25% by weight of molybdenum, about 0.022% by weight of carbon and about 0.12% by weight of nitrogen.

4. The process of claim 1, wherein the walls of said passivated reaction vessel consist of from 16 to 28% by weight of chromium, from 10 to 50% by weight of nickel, from 1 to 4% by weight of molybdenum and at most 0.05% by weight of carbon, together with a minor amount of nitrogen, said amount of nitrogen being at least 0.12% and no greater than 0.5% by weight in addition to iron.

5. The process of claim 1, wherein all accessory equipment which comes into contact with the reaction mixture consists of the alloy recited for the walls of said reaction vessel.

6. A method for passivating a reaction vessel for the manufacture of hydroxylammonium salts by the catalytic reduction of nitric oxide with hydrogen in a dilute aqueous mineral acid in the presence of a suspended platinum catalyst at an elevated temperature, said reaction vessel consisting of essentially copper-free molybdenum-containing austenitic chromium-nickel steel which consists essentially of from 16 to 28% by weight of chromium, from 10 to 50% by weight of nickel, from 1 to 4% by weight of molybdenum, at most 0.05% by weight of carbon, and 0.12% to 0.5% by weight of nitrogen, remainder iron; which comprises exposing the reaction vessel to the process for the manufacture of hydroxylammonium salts for about 200 hours.

* * * * *